United States Patent [19]

Sauter et al.

[11] 4,148,556

[45] Apr. 10, 1979

[54] MULTIMODE OPTIC DEVICE

[75] Inventors: Gerald F. Sauter, Eagan; Roger W. Honebrink, Chaska, both of Minn.

[73] Assignee: Sperry Rand Corporation, New York, N.Y.

[21] Appl. No.: 864,167

[22] Filed: Dec. 27, 1977

[51] Int. Cl.² ............................ G02B 5/14; G02F 1/22
[52] U.S. Cl. .............................. 350/96.13; 350/96.17; 350/96.19; 350/151; 350/162 R
[58] Field of Search ............... 350/96.13, 96.14, 96.17, 350/96.19, 151, 162 R

[56] References Cited

U.S. PATENT DOCUMENTS

| | | | |
|---|---|---|---|
| 3,752,563 | 8/1973 | Torok et al. | 350/162 R |
| 3,967,877 | 7/1976 | Heideich et al. | 350/96.17 |
| 3,990,776 | 11/1976 | Tseng et al. | 350/96.13 |
| 4,003,629 | 1/1977 | Baues et al. | 350/96.14 |
| 4,032,216 | 6/1977 | Henry | 350/96.13 |

*Primary Examiner*—John K. Corbin
*Assistant Examiner*—Stewart Levy
*Attorney, Agent, or Firm*—Kenneth T. Grace; William E. Cleaver; Marshall M. Truex

[57] ABSTRACT

Disclosed is a solid state apparatus for and a method of (1) modulating the intensity of a multimode light beam; (2) coupling the light beam to an input optic fiber that is butt coupled to a diffraction grating that is formed of a plurality of stripe domains in a magnetic film; (3) altering, by the application of suitable magnetic fields, the angular orientation of the stripe domains in the plane of the magnetic film, and (4) multiplexing the diffracted light beam to a selected one of a plurality of several output optic fibers. The apparatus uses a liquid-phase epitaxially (LPE) grown film of bismuth substituted rare earth iron garnet to form a magnetizable layer in which stripe domains may be generated, sustained and moved about. The stripe domains form a diffraction grating. The angular orientation of the stripe domains in the plane of the diffraction grating may be altered by the application of external magnetic fields — see the E. J. Torok, et al, U.S. Pat. No. 3,752,562 — to alter the angle from which the diffracted light beam is emitted from the diffraction grating. The altered or rotated stripe domains are, in turn, utilized to alter the direction that the deflected light beam is emitted from the diffraction grating and into, along and out of a selected one of a plurality of output optic fibers that are oriented along the surface of an inverted cone, which cone is aligned, along its longitudinal axis, with the optic axis of the input optic fiber.

7 Claims, 7 Drawing Figures

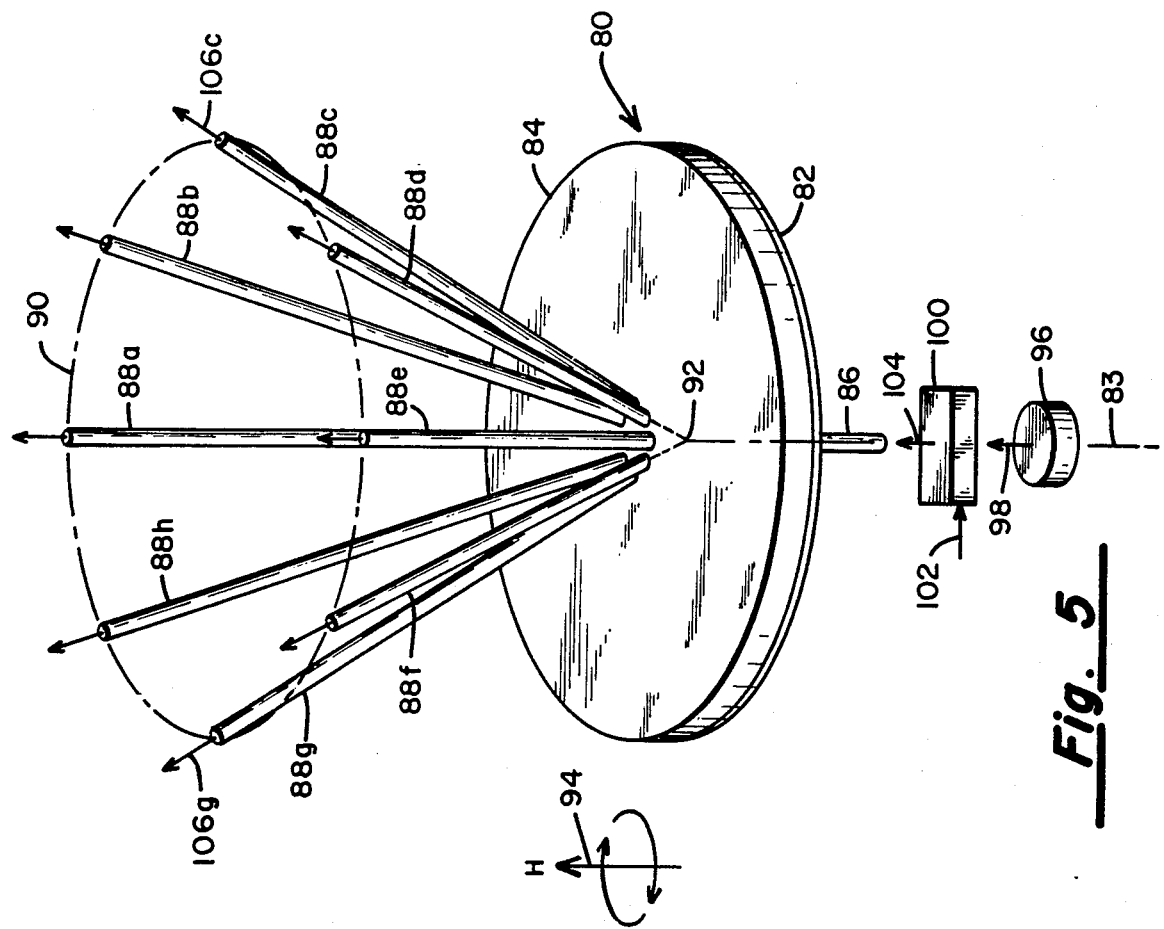
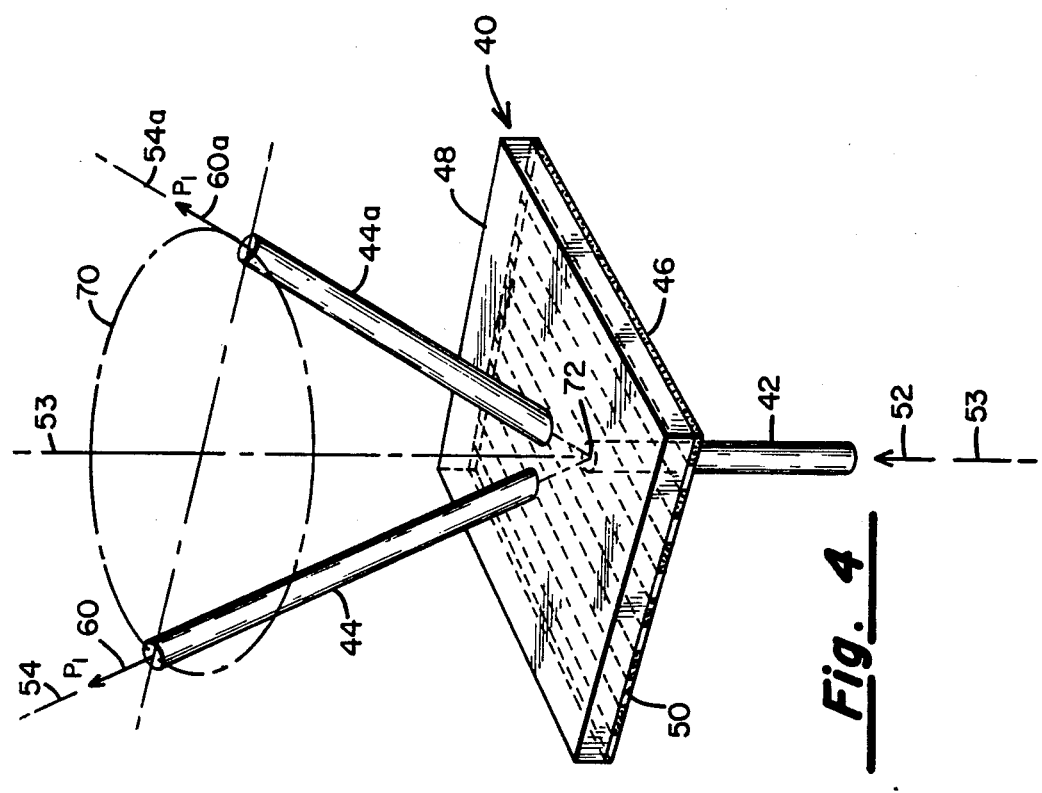

MULTIMODE OPTIC DEVICE

BACKGROUND OF THE INVENTION

In the prior art it is known that the field of optic devices includes many solid state devices that operate as optical waveguides for optical communications systems— see the publication "Survey of Integrated Optics," S. E. Miller, IEEE Journal of Quantum Electronics, Volume QE-8, No. 2, February, 1972, pp. 199–205. Recently developed thin film technology has permitted the fabrication of miniature, solid state devices that permit the transfer of optical power from a thin film structure to an associated optical fiber transmission line—see the I. P. Kaminow, et al, published patent application No. B 381,985, published Feb. 3, 1976.

In the co-pending patent application of G. F. Sauter, et al, Ser. No. 709,468, filed July 28, 1976, now U.S. Pat. No. 4,082,424, there is disclosed an integrated optic device including a diffraction grating consisting of a stripe domain garnet film that is in intimate contact with a suitable waveguide member, both supported by a suitable substrate member. A laser beam that is directed incident to the surface of the stripe domain garnet film is selectively, varyingly coupled to the waveguide (modulated in intensity) and is selectively, varyingly directioned along the plane of the waveguide to be directed upon a selected one of a plurality of couplers for retransmission to an associated optic fiber transmission line (multiplexed). The magnetic film stripe domain diffraction grating and the method of the operation thereof of the E. J. Torok, et al, U.S. Pat. No. 3,752,563 are utilized as the means for coupling, modulating and multiplexing the laser beam to and within the optical waveguide for subsequent processing of the data that is borne by the laser beam. In this apparatus and method, the light beam is limited to a single mode, single frequency light beam because of the use of the intermediate waveguide. The present invention is considered to be an improvement of such prior art optic device in that the present invention may use a multimode, multifrequency light beam for signal transmission whereby the design limitations of the apparatus are substantially reduced resulting in a simplified optical multiplexer of data-modulated light beams.

SUMMARY OF THE INVENTION

The present invention relates to a multiplexer of a data-modulated light beam by a diffraction grating that consists of a stripe domain, e.g., garnet, film that is in intimate contact with a suitable substrate member. A multimode, multifrequency light beam is directed incident to a first surface of the stripe domain garnet film by an input optic fiber while the stripe domains are rotated, by suitable magnetic fields, in the plane of the garnet film. The rotated stripe domains then selectively, varyingly couple the diffracted light beam upon a selected one of a plurality of output optic fibers that are directed angularly incident to the second surface of the stripe domain garnet film for retransmission to an associated optic fiber transmission line (multiplexed).

BRIEF DESCRIPTION OF THE DRAWINGS

FIG. 4 is a diagrammatic perspective view of the diffraction grating of FIG. 3 further illustrating the orientation of two first-order output optic fibers as aligned on the surface of the cone of output optic fiber axes.

FIG. 5 is a diagrammatic illustration of a portion of an optical transmission system incorporating the present invention.

DESCRIPTION OF THE PREFERRED EMBODIMENT

The present invention relates to an optical device that utilizes the magneto-optic effect and the stripe domain characteristics of a liquid-phase epitaxy (LPE) film or layer of, e.g., bismuth substituted rare earth iron garnet ($Bi_XYb_{3-X}Fe_5O_{12}$), wherein X has the range $0.7 \times 1.2$. The stripe domains in the epitaxial film form a phase grating structure whereby the amplitude and direction of an incident multimode, multifrequency, light beam may be altered by the application of an external magnetic field that is oriented in the plane of the epitaxial film and that is varied in magnitude and direction.

Figure 1A:
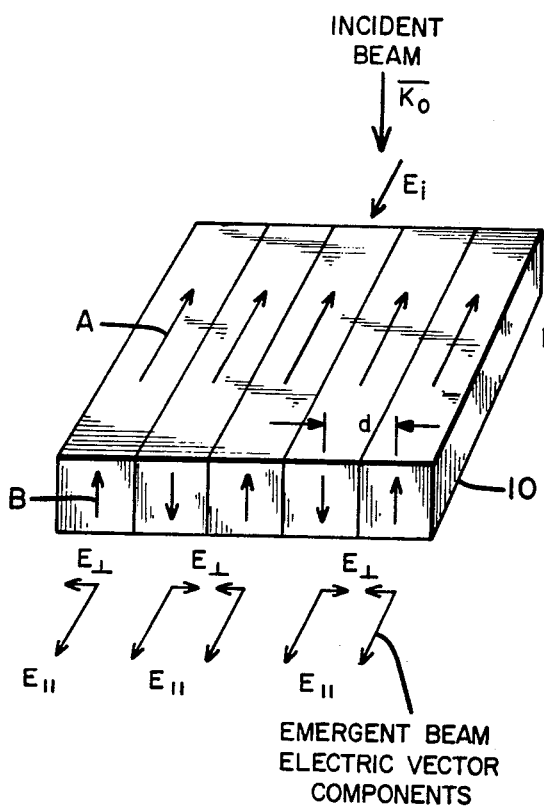
FIGS. 1a, 1b are illustrations of the stripe domain patterns that are utilized by the present invention.
Figure 1B:
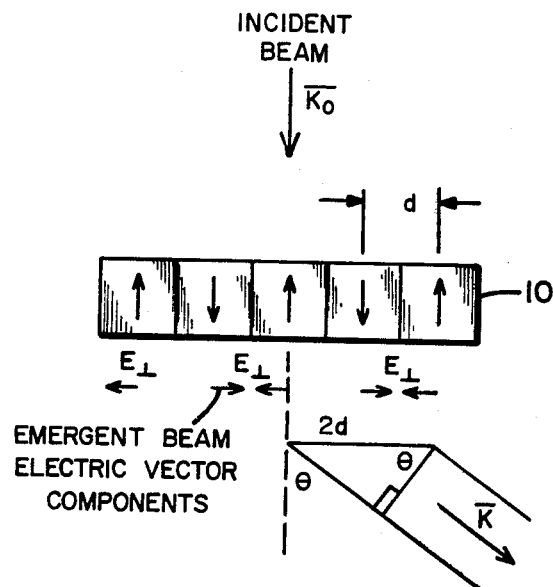

With particular reference to FIGS. 1a, 1b, there is illustrated the stripe domain pattern that is found in an LPE rare earth iron garnet film 10. The stripe domain pattern of the magnetization M within film 10 consists of parallel components, A, in the plane of film 10, and parallel and anti-parallel components, B, that are normal to the plane of film 10. These stripe domains can introduce a periodic 180° phase variation in an incident light beam.

Consider a plane electro-magnetic wave, $\overline{K}_o$, incident to film 10. This plane wave $\overline{K}_o$ experiences a periodic phase variation as it propagates through film 10. The phase change is due to the Faraday rotation, and the periodicity is caused by the parallel and anti-parallel nature of the normal components, B, of the magnetization M of film 10. The emergent, differentially-rotated light beam $\overline{K}$ has an electric vector component $E_\perp$ which is orthogonal to the direction of the stripe domain pattern. In the far field region, this alternating vector pattern causes constructive interference at angles $\theta_n$ given by the equation $$\sin \theta_n = n\lambda_o/2d$$

where n is the order of the beam (n=0, 1, 3, 5, etc.) and d is the stripe domain spacing. The maximum intensity in the diffracted beam $\overline{K}$ is attained when the Faraday rotation is ±90°. In this special case, 81% of the light goes into the first-order diffracted beam, 9% goes into the third-order diffracted beam, etc. If the Faraday rotation is less than ±90°, only the efficiency, not the diffracted angle, $\theta$, is affected.

The domain spacing, d, and therefore the angle of diffraction, $\theta$, can be changed by an external magnetic field, H, that is applied parallel to the stripe domain length and in the plane of film 10. In addition, the entire stripe domain pattern can be rotated about an axis that is normal to the plane of the film 10 by simply rotating the external magnetic field, H, about the same axis. This is as taught by the E. J. Torok, et al, U.S. Pat. No. 3,752,563. To form an optic device, the crystal grating structure formed by the epitaxial film 10 is placed in intimate contact with a suitable substrate member. This results in an optic device for diffracting a light beam that is directed normally incident to the surface of film 10 and, by rotating the stripe domains within film 10, steering the diffracted light beam upon a selected one of a plurality of output optic fibers that are coupled to the opposite surface of the substrate that supports film 10 to which the light beam is coupled by the input optic fiber.

Figure 2:
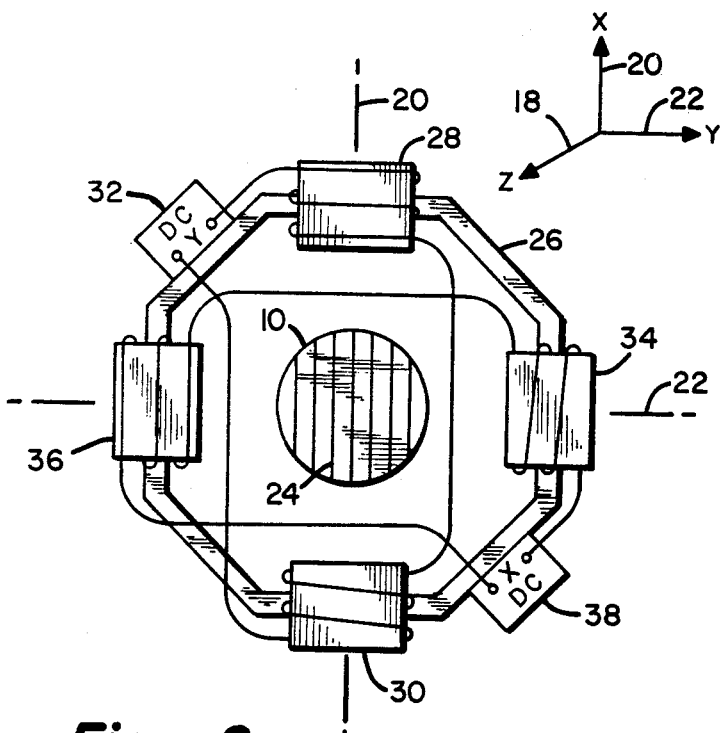
FIG. 2 is an illustration of a device for applying the necessary operating fields to the stripe domain film of FIGS. 1a, 1b.

With particular reference to FIG. 2, there is presented an illustration of a device, such as illustrated in the E. J. Torok, et al, U.S. Pat. No. 3,752,563, for applying orthogonal DC fields $H_X$, $H_Y$ in the plane of film 10 of FIGS. 1a, 1b. Film 10 has associated therewith three mutually orthogonal axes 18, 20, 22. Axes 20, 22 are in the plane of film 10, with axis 20 oriented parallel to stripe domain walls 24. About film 10 is a yoke 26, rotatable about an axis 18 that is normal to the plane of film 10 and that passes through the intersection, in the plane of film 10, of axes 20, 22, upon which are mounted: DC field coils 28, 30 and the associated DC drive signal source 32; and DC field coils 34, 36 and the associated DC drive signal source 38. As stated in the above referenced E. J. Torok, et al, U.S. Pat. No. 3,752,563, when a film 10, having its magnetization M arranged in a plurality of stripe domains, is effected by a DC field that is parallel to, or in, the plane of the film and parallel or anti-parallel to the magnetization polarization of the stripe domains: the stripe domain width is made to vary; when the applied DC field is parallel to the magnetization polarization, the stripe domain width decreases; when the applied DC field is anti-parallel to the magnetization polarization, the stripe domain width increases.

Without rotating yoke 26 about axis 18, stripe domain walls 24 may be established in any angular orientation $\phi$ about axis 18 by the coupling of the in-plane, concurrent, pulsed DC fields $H_X$ and $H_Y$ of the proper polarity and magnitude. This electronic switching or rotation of the stripe domain walls 24 in film 10 establishes the orientation of the stripe domain walls 24 at the angle $\phi$, where $$\tan \phi = H_Y/H_X,$$

where the resultant field $H_T$ is greater than the anisotropy field $H_K$ of film 10 and $$|H_K| < |H_T| = \sqrt{H_X^2 + H_y^2}.$$

Figure 3:
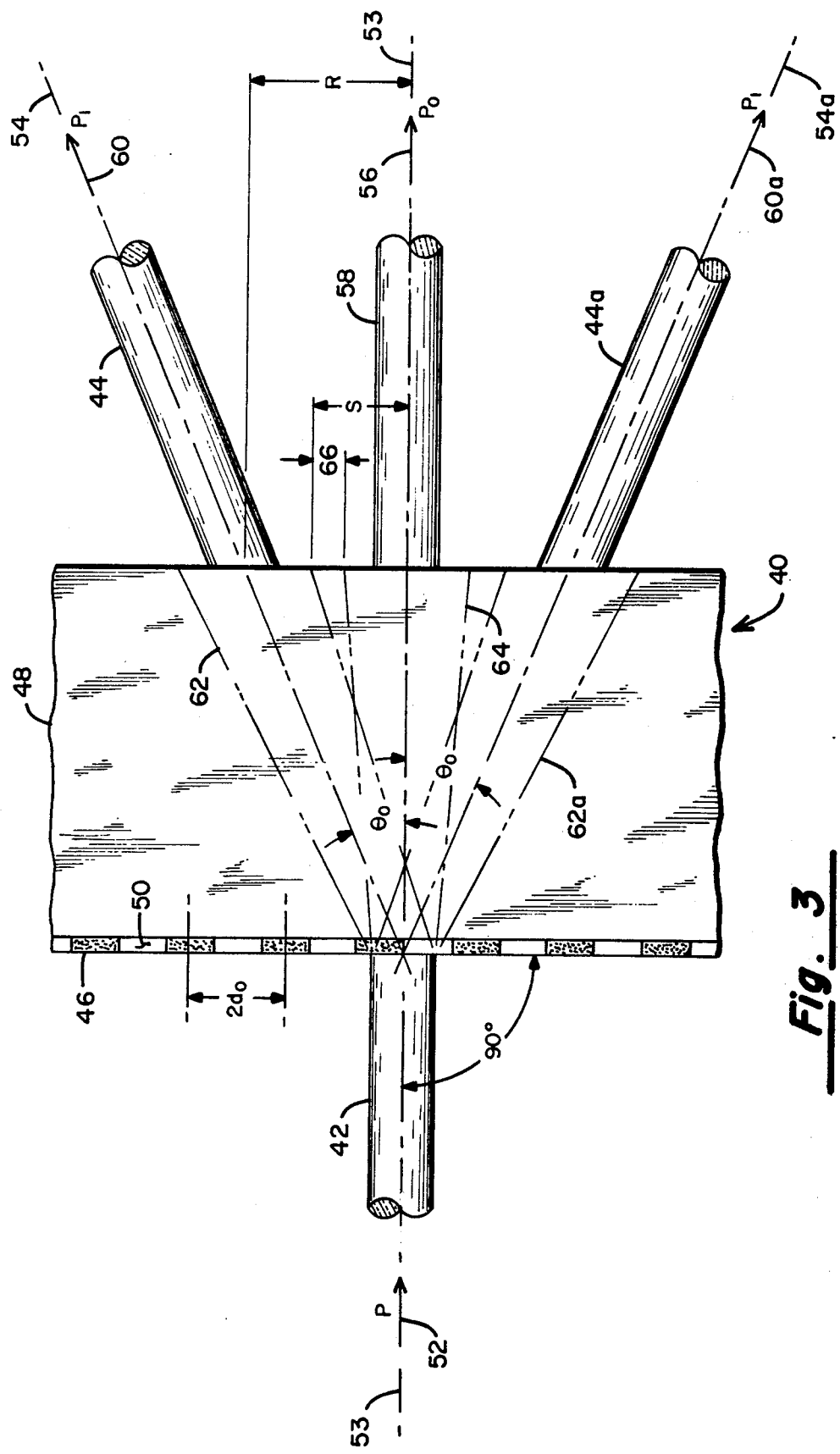
FIG. 3 is an illustration of a cross-section of the diffraction grating of the present invention illustrating the orientation of the input and output optic fibers on opposite sides of the diffraction grating.

With particular reference to FIG. 3, there is presented an illustration of a cross-section of the diffraction grating 40 of the present invention illustrating the orientation of the input optic fiber 42 and the output optic fiber 44 which are affixed to the exposed surfaces of film 46 and substrate 48, respectively. Film 46 is an LPE layer of bismuth substituted iron garnet of, e.g., 4 microns (μm) in thickness that is epitaxially grown upon a gadolinium gallium garnet (GGG) substrate 48 of, e.g., 0.5 millimeters (mm) in thickness. Film 46 consists a plurality of stripe domains 50 that are closely spaced, e.g., d=0.6 μm, straight and parallel. A multimode and multifrequency light beam 52, i.e., a light beam of many frequencies or wavelengths centered about a center wavelength $\lambda_c$ and of power P, is directed normally incident to the exposed planar surface of film 46 along the optic axis 53 via input optic fiber 42 wherein the light beam 52, in passing through film 10, is diffracted through an angle $\theta$ wherein $$\theta = \sin^{-1} (\lambda_c/2dn)$$

where
$\lambda_c$ = the center wavelength of the light beam.
2d = separation, i.e., centerline-to-centerline spacing, of the stripe domains 50 of film 46.
n = index of refraction of substrate 48.

When the applied field is zero d=$d_O$ and $$\theta = \theta_O = \sin^{-1} (\lambda_c/2d_On).$$

See the publication "Variation of Stripe Domain Spacing in a Faraday Effect Light Deflector," T. R. Johansen, et al, Journal of Applied Physics, Volume 42, Page 1715, 1971.

In the diffraction grating 40 of FIG. 3, a single input optic fiber 42 is butt-coupled to the exposed surface of film 46 and its optic axis 53 is oriented orthogonally to the plane of film 46. A plurality of output optic fibers 44, 44a are butt-coupled to the exposed surface of substrate 48 and their optic axes 54, 54a, respectively, are aligned along the surface of an optic cone whose major axis is aligned with optic axis 53 and whose surface is at an angle $\theta_O$ with respect to the optic axis 53 such that the optic axes 54, 54a are aligned with the diffraction angle $\theta_{O\,1\,with\,a}$ 0 (zero) applied field. In the embodiment of FIG. 3, $\theta_O$ is typically 15°.

As is known, see the E. J. Torok, et al, U.S. Pat. No. 3,752,563, diffraction grating 40 causes light beam 52 of input power P to be diffracted into diffracted light beams of several orders. As illustrated in FIG. 3, the 0'th order light beam 56 of an output power $P_O$ (wherein film 46 is not a perfect crystal, i.e., the grating does not yield a 100% diffraction efficiency, and does couple a 0'th (zero'th) order light beam 56 along optic axis 53 through optic fiber 58) is coupled to and transmitted by output optic fiber 58, along optic axis 53 while the 1'st (first) order light beams 60, 60a, of an output power $P_1$, where $2P_1=0.81P$ for a perfect crystal, are coupled to and tramsmitted by output optic fibers 44, 44a along optic axes 54, 54a, respectively. Accordingly, the output optic fibers 44, 44a are aligned along the 1'st order optic axes for maximum efficiency. Because of the fact that film 46 is not a perfect crystal, the design of diffraction grating 40 is selected such that $\theta_0$ is of a sufficient size to preclude interference between the 0'th and 1'st order diffracted light beams. Also, the diffracted light beams do undergo some dispersion when passing through substrate 48 forming expanded light cones 62, 62a, 64 which further control the optimum diffraction angle $\theta_0$ by requiring a minimum spacing 66 therebetween to preclude interference between adjacently ordered light beams. Thus, the output optic fibers 44, 44a are spaced around a circle on the exposed surface of substrate 48 having the radius R whose center is on optic axis 53 and whose optic axes are along the surface of a right angled optic cone whose surface is at the diffraction angle $\theta_0$ with respect to the optic axis 53 and whose major axis is co-linear with the optic axis 53.

With particular reference to FIG. 4, there is presented a diagrammatic perspective view of the diffraction grating 40 of FIG. 3 further illustrating the orientation of the two first order output optic fibers 44, 44a as aligned along the surface of the optic cone 70 along which are aligned output optic axes 54, 54a, respectively. As discussed hereinabove with particular reference to FIG. 2, the coupling of the proper DC magnetic fields, of the proper magnitude and direction, in the plane of film 46 rotates the angular orientation of stripe domains 50 whereby the first ordered diffracted light beam may be switched to and be directed along any line that lies on the surface of cone 70 and that originates at the apex 72 of cone 70, which apex 72 lies on the intersection of optic axis 53 and the exposed surface of film 46.

With particular reference to FIG. 5, there is presented a diagrammatic illustration of a portion of an optical transmission system incorporating the present invention. In the embodiment of FIG. 5, diffraction grating 80 is illustrated as being of a circular planar contour having an LPE film 82 grown on a GGG substrate 84. Butt-coupled to the exposed surface of film 82 and along the orthogonally oriented optic axis 83 is an input optic fiber 86. Butt-coupled to the exposed surface of substrate 84 are a plurality of output optic fibers 88a through 88h. The optic axes of output optic fibers 88a through 88h are aligned along the surface of cone 90, the major axis of which is co-linear with optic axis 83 and the apex of which is oriented at the intersection, i.e., the join, of optic axis 83 and the exposed surface of film 82.

By a coupling of the DC field 94 $H_T$ of the proper angle, magnitude and polarity, the stripe domains in film 82 may be oriented at any angular orientation within the plane of film 82. After the stripe domains in film 82 have been oriented at the desired angular relationship with the particularly selected output optic fiber 88, the so-applied DC field $H_T$ is removed such that there is a substantially zero applied field $H_O$.

Figure 6:
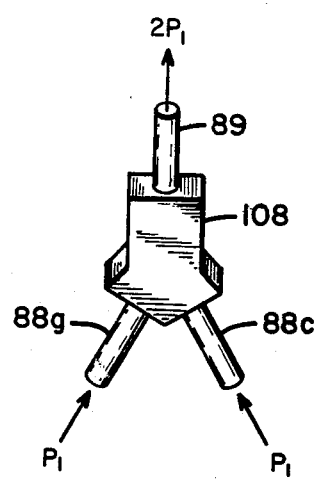
FIG. 6 is a diagrammatic perspective view of a device for coupling two first order output optic fibers to a single output fiber.

Now, a source 96 of a multimode, multifrequency light beam 98, such as a light emitting diode, couples light beam 98 to light modulator 100. Light modulator 100, which is under control of an appropriate input data signal on line 102, modulates the intensity of light beam 98 providing at its output a data modulated light beam 104. Data modulated light beam 104, along optic axis 84, is then coupled into input optic fiber 86. With an applied field $H_T$ in the plane of film 82, as indicated by vector 94, the now data modulated light beam 104 would be diffracted, by diffraction grating 80, and the first order light beam would be directed along the optic axes 106c and 106g of output optic fibers 88c and 88g, respectively. Because maximum light beam power is achieved in the first order optic fibers 88c, 88g, such output optic fibers may be joined by an optic fiber coupler 108—see FIG. 6—to produce on a single output optic fiber 89 the sum of the light beam power in output optic fibers 88c and 88g, i.e., 81% of the light beam power in input optic fiber 86 if film 82 is a perfect crystal. Alternatively, the embodiment of FIG. 5 may be utilized with only the output optic fibers 88a through 88d wherein the plurality of output optic fibers 88 are arranged along less than one-half of the optic cone 90. This arrangement would lessen alignment and fabrication difficulties.

In accordance with the above, it can be seen that the present invention provides a substantial improvement over that of the known prior art in that the diffraction gating and the optical system into which it is incorporated operate with a multimode, multifrequency light beam not limited to the characteristics of a waveguide such as required in most prior art optic devices.

What is claimed is:

1. An optic fiber device, comprising:
   a planar substrate member having first and second planar parallel surfaces;
   a planar magnetizable film having stripe domains, which stripe domains are capable of being sustained and moved, said magnetizable film being a layer that is integral with the first surface of said substrate member;
   an input optic fiber that is coupled to said magnetizable film at the join of its optic axis and the first planar surface of said magnetizable film;
   a plurality of output optic fibers that are coupled to the second planar surface of said substrate member, said output optic fibers radially oriented about said joint at a predetermined radial distance and at predetermined angular spacings;
   means for directing a light beam along the optic axis of said input optic fiber; and
   means coupling a field H in the plane of said magnetizable film for rotating said light beam at said join and directing said rotated light beam upon a selected one of said output optic fibers.

2. The optic fiber device of claim 1 wherein said input optic fiber is coupled to said magnetizable film with its optic axis orthogonal to the plane of said magnetizable film at said join.

3. The optic fiber device of claim 1 wherein said light beam is multimode, multifrequency.

4. The optic fiber device of claim 1 wherein said rotated light beam is directed upon the selected one of said output optic fibers when said field H is of zero magnitude.

5. The optic fiber device of claim 1 wherein said rotated light beam has its two first order light beams directed along a selected two of said output optic fibers.

6. The optic fiber device of claim 5 further including means for coupling said two first order light beams along said selected two output optic fibers to a single output fiber.

7. An optic fiber device, comprising:
   a planar substrate member having first and second planar parallel surfaces;
   a planar magnetizable film having a plurality of parallel, straight stripe domains, which stripe domains are spaced apart on the center-to-center spacing 2d and which are capable of being sustained and moved, said magnetizable film being a layer that is integral with the first surface of said substrate member;
   an input optic fiber that is coupled to said magnetizable film at the join of its optic axis and the first planar surface of said magnetizable film;
   a plurality of output optic fibers that are coupled to the second planar surface of said substrate member, said output optic fibers radially oriented along their optic axes about said join at a predetermined radial distance and at predetermined angular spacings;
   said plurality of output optic fibers having their optic axes spaced along the surface of an optic cone whose longitudinal axis is co-linear with the optic axis of said input optic fiber and whose surface forms the angle $\theta_O$, at a zero applied field H, therewith as determined by the equation $$\theta_O = \sin^{-1}(\lambda_c / 2d_{Cn})$$

where
   $\lambda_c$ = center wavelength of the multimode light beam;

$2d_O$ = center-to-center spacing of the stripe domains in the magnetizable layer at zero applied field;

n = index of refraction of the substrate member;

means for directing a light beam along the optic axis of said input optic fiber; and means coupling an applied field H in the plane of said magnetizable film for rotating said light beam at said join and directing said rotated light beam at said diffraction angle $\theta_O$ and along the optic axis of a selected one of said output optic fibers.

* * * * *